(12) United States Patent
Yamaguchi

(10) Patent No.: US 7,957,567 B2
(45) Date of Patent: Jun. 7, 2011

(54) METHOD, APPARATUS, AND PROGRAM FOR JUDGING FACES FACING SPECIFIC DIRECTIONS

(75) Inventor: Yoshitaka Yamaguchi, Kanagawa-ken (JP)

(73) Assignee: Fujifilm Corporation (JP)

( * ) Notice: Subject to any disclaimer, the term of this patent is extended or adjusted under 35 U.S.C. 154(b) by 1141 days.

(21) Appl. No.: 11/709,194

(22) Filed: Feb. 22, 2007

(65) Prior Publication Data

US 2007/0196019 A1    Aug. 23, 2007

(30) Foreign Application Priority Data

Feb. 23, 2006   (JP) .................................. 2006-046481

(51) Int. Cl.
*G06K 9/00* (2006.01)
(52) U.S. Cl. ....................................................... 382/118
(58) Field of Classification Search .................. None
See application file for complete search history.

(56) References Cited

FOREIGN PATENT DOCUMENTS

JP    5-282457 A    10/1993
JP    2005-250772 A    9/2005

OTHER PUBLICATIONS

S. Lao et al., Meeting on Image Recognition and Understanding (MIRU2004), 2004, 11-271-11-276.

*Primary Examiner* — Samir A Ahmed
*Assistant Examiner* — Fred Hu
(74) *Attorney, Agent, or Firm* — Studebaker Brackett PC; Donald R. Studebaker

(57) ABSTRACT

A partial image is cut out from an input image. A first classifier judges whether the partial image includes a face facing a direction within a first angular range. Another classifier judges whether the partial image includes a face facing a direction within another angular range that partially overlaps with the first angular range. The partial image is judged to include a face facing a direction within a specific angular range, which is the first angular range from which the portion that overlaps with the other angular range has been removed, if the first classifier judges that the image includes a face facing a direction within the first angular range, and the other classifier judges that the image does not include a face facing the second angular range. Each classifier is generated by machine learning, and judges whether images include faces facing directions corresponding to predetermined angular ranges.

9 Claims, 16 Drawing Sheets

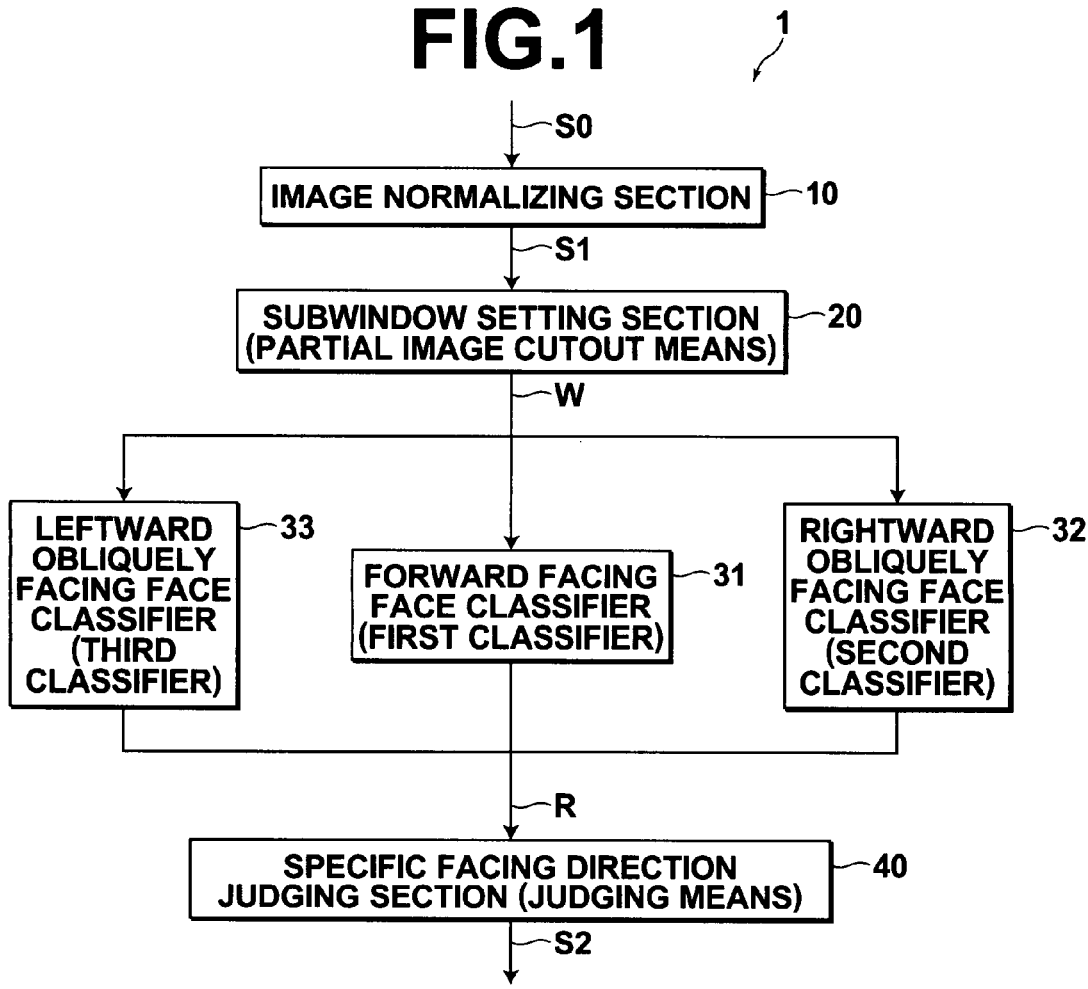
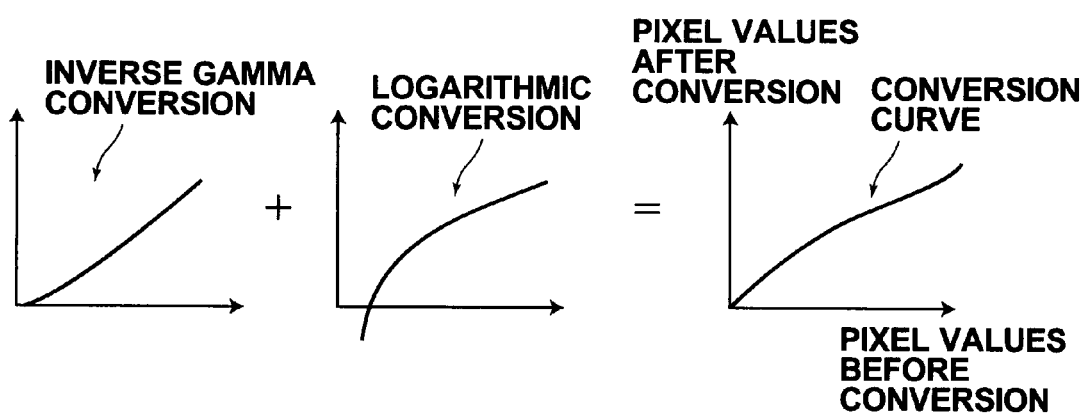

FIG.13

| PARTIAL IMAGE W (DETECTION TARGET) | LEFTWARD OBLIQUELY FACING FACE CLASSIFIER (-15°~-75°) | FORWARD FACING FACE CLASSIFIER (-30°~+30°) | RIGHTWARD OBLIQUELY FACING FACE CLASSIFIER (+15°~+75°) | FORWARD FACING FACE JUDGMENT (-15°~+15°) |
|---|---|---|---|---|
| (0°) | × | ○ | × | ○ |
| (-20°) | ○ | ○ | × | × |
| (+20°) | × | ○ | ○ | × |

○ ···INDICATES AFFIRMATIVE JUDGMENT FOR FACING DIRECTION
× ···INDICATES NEGATIVE JUDGMENT FOR FACING DIRECTION

FIG.15A CLASSIFIER HAVING LOW DEGREE OF TOLERANCE WITH RESPECT TO FACIAL SHAPES
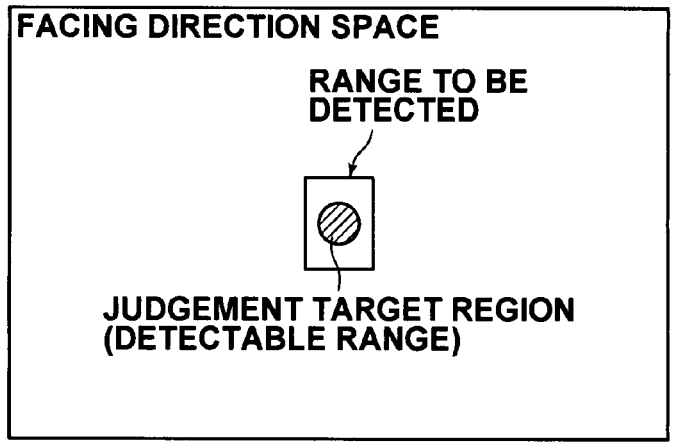
FIG.15B CLASSIFIER HAVING HIGH DEGREE OF TOLERANCE WITH RESPECT TO FACIAL SHAPES
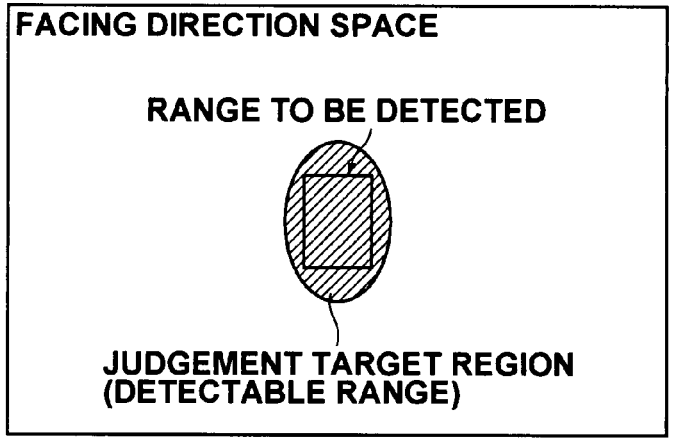
FIG.15C COMBINATION OF CLASSIFIERS HAVING HIGH DEGREE OF TOLERANCE WITH RESPECT TO FACIAL SHAPES
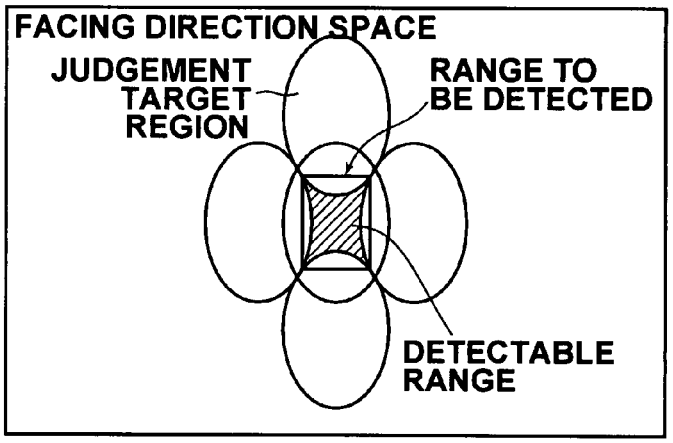

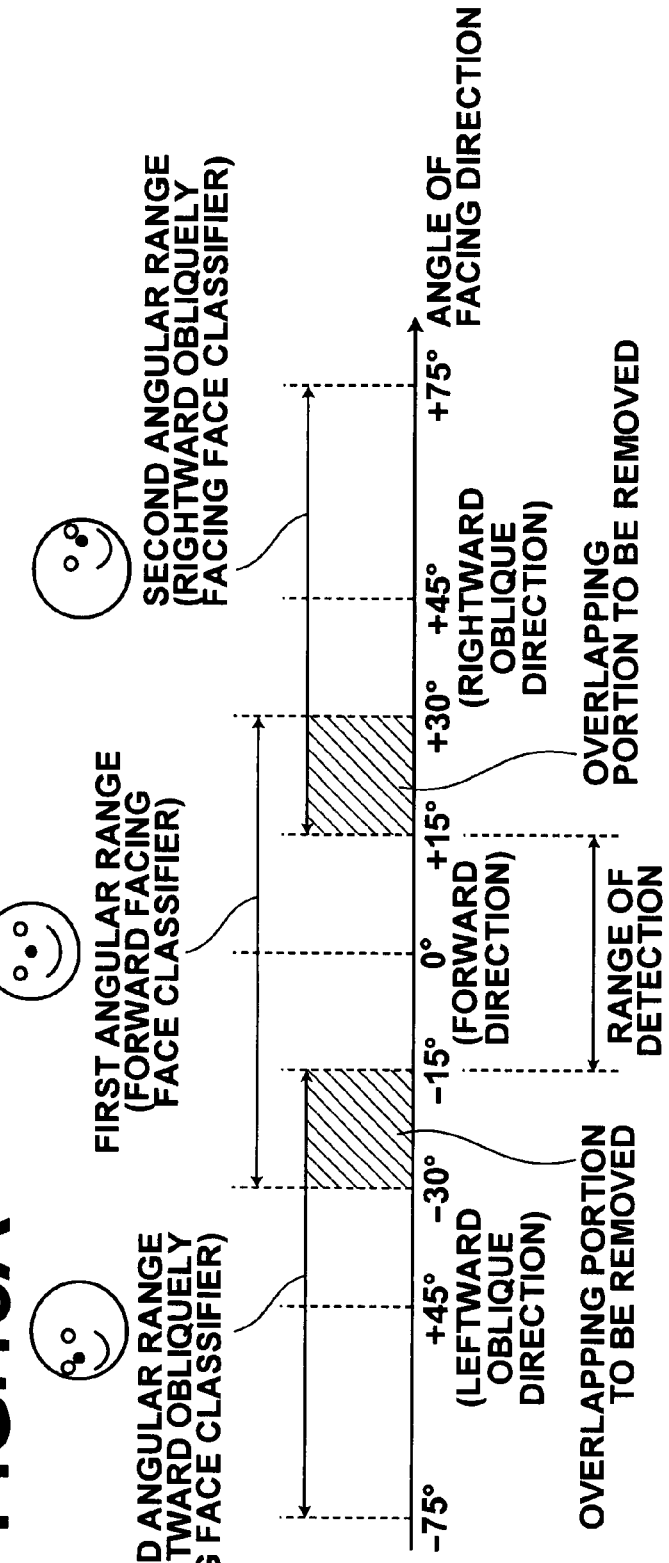

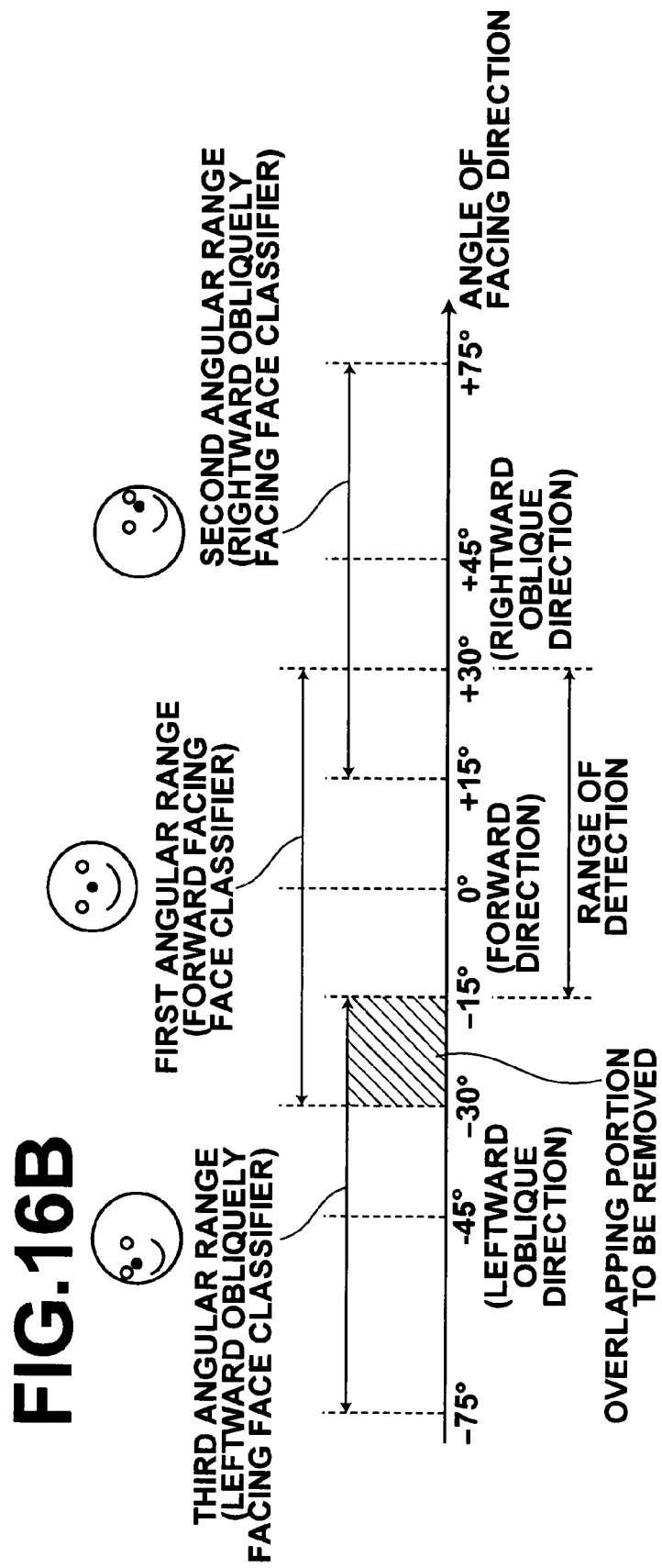

METHOD, APPARATUS, AND PROGRAM FOR JUDGING FACES FACING SPECIFIC DIRECTIONS

BACKGROUND OF THE INVENTION

1. Field of the Invention

The present invention relates to a method, an apparatus, and a program for detecting faces facing specific directions from within digital images.

2. Description of the Related Art

Conventionally, techniques for detecting faces included in digital images (hereinafter, simply referred to as "images") are utilized in various fields, such as digital cameras and authenticating systems. However, there are cases in which a technique that detects only faces facing specific directions within images is desired.

As a method for detecting only faces facing specific directions, a method, in which partial images are cut out from a plurality of different positions within an image, and whether each of the partial images includes a face facing the specific directions is judged, may be considered. To perform the judgments, the use of classifiers, which are generated by a machine learning method employing sample images, are superior in classifying accuracy, and are robust, may be considered. Previously proposed techniques employing such classifiers are as follows.

S. Lao et al. disclose a method for discriminating the directions in which faces are facing within images, in "Fast Omni-Directional Face Detection", Meeting on Image Recognition and Understanding (MIRU2004), July 2004. In this method, human faces are designated as predetermined subjects, and the directions that the faces are facing are designated as the states of the subject. Classifiers for judging whether judgment target images include faces facing in predetermined directions are prepared for each direction that the faces face, and the directions in which the faces are facing are discriminated thereby.

In addition, Japanese Unexamined Patent Publication Nos. 5(1993)-282457 and 2005-250772 disclose methods in which classifiers are generated by the same basic method as disclosed by Lao et al. However, in these methods, the sample images for learning include magnified/reduced images, rotated images, and images with different aspect ratios. Thereby, there is a degree of tolerance in the shapes of faces capable of being judged by the classifiers.

In order to generate classifiers for classifying faces facing specific directions, a method based on the machine learning technique employing sample images as disclosed by Lao et al. may be considered. That is, classifiers may be generated by machine learning employing sample images that include faces facing in angular ranges corresponding to the specific directions to be classified.

Here, in the case that the faces facing a specific direction are to be detected in a highly discriminate manner, it is necessary to narrow the aforementioned angular range of faces included in the sample images. However, judgment results by classifiers, which are generated employing sample images with narrow angular ranges of faces therein, are likely to be influenced by variations in the shapes of faces. These classifiers are not applicable to cases in which the shapes of faces differ. Therefore, there is a problem that detection using these types of classifiers does not detect all faces facing the specific direction within an image. That is, the detection rate becomes low when these types of classifiers are used.

On the other hand, in the case that faces facing a specific direction are to be detected with a high detection rate, classifiers which are applicable to faces having different shapes may be generated. These classifiers may be generated by employing magnified/reduced sample images, rotated sample images, and sample images having different aspect ratios, as proposed in Japanese Unexamined Patent Publication Nos. 5(1993)-282456 and 2005-250772. The angular ranges of faces, which are judgment targets of classifiers generated in this manner, tend to be wider, and there is a problem that detection in a discriminatory manner is not possible by using these classifiers.

That is, face classifiers generated by machine learning employing the aforementioned sample images have wide angular ranges in the direction that faces to be detected are facing, if the degree of tolerance with respect to the shapes of faces is increased. Conversely, if the degree of tolerance is decreased, the angular ranges become narrow. Therefore, it is difficult for a large degree of tolerance and a narrow angular range to be compatible in face classifiers. If faces facing specific directions are to be detected from within images by using face classifiers, it is difficult to achieve a high detection rate simultaneously with highly discriminatory detection with respect to the specific directions.

FIGS. 15A and 15B are conceptual diagrams that illustrate the relationship between the detection rate and the discriminatory nature of detection. In each of FIGS. 15A and 15B, a ranges of specific facing directions to be detected and a range of facing directions detectable by a classifier are indicated in a space that represents facing directions. FIG. 15A illustrates a case of a classifier which has been generated by learning employing sample images of faces having a comparatively narrow range of facing directions. In this case, detection of faces facing a specific direction can be performed in a highly discriminatory manner, as the range of detectable facing directions becomes narrower. However, the classifier is not capable of detecting faces having various shapes, and therefore the detection rate is low. On the other hand, FIG. 15B illustrates a case of a classifier which has been generated by learning employing sample images of faces having a comparatively wide range of facing directions, and variations in the shapes thereof. In this case, the classifier is capable of detecting faces having various shapes, and therefore the detection rate is high. However, the detectable range of the classifier becomes greater than the range of specific facing directions to be detected, and detection of faces facing a specific direction cannot be performed in a highly discriminatory manner.

SUMMARY OF THE INVENTION

The present invention has been developed in view of the foregoing circumstances. It is an object of the present invention to provide a method, apparatus, and program for detecting faces facing specific directions, capable of detecting faces in a highly discriminatory manner with respect to the facing direction while achieving a high detection rate.

A specific facing direction face detecting method of the present invention is a method for detecting faces facing specific directions by employing classifiers that judge whether judgment target images include faces facing directions within angular ranges corresponding to predetermined angular ranges, generated by a machine learning technique employing a plurality of sample images that include faces having different shapes and facing directions within the predetermined angular ranges, comprising the steps of:

cutting out a partial image from an input image;

judging the partial image employing a first classifier that judges whether an image includes a face facing a direction within a first angular range;

judging the partial image employing at least one other classifier that judges whether an image includes a face facing a direction within at least one other angular range, a portion of which overlaps with the first angular range; and judging that the partial image includes a face facing a direction within a specific angular range, which is the first angular range from which the portion that overlaps with the at least one angular range corresponding to the at least one other classifier has been removed, in the case that partial image is judged to include a face facing a direction within the first angular range and judged not to include a face within the other angular range.

A specific facing direction face detecting apparatus of the present invention is an apparatus for detecting faces facing specific directions by employing classifiers that judge whether judgment target images include faces facing directions within angular ranges corresponding to predetermined angular ranges, generated by a machine learning technique employing a plurality of sample images that include faces having different shapes and facing directions within the predetermined angular ranges, comprising:

partial image cutout means, for cutting out a partial image from an input image;

a first classifier, for judging whether the partial image includes a face facing a direction within a first angular range;

at least one other classifier, for judging whether the partial image includes a face facing a direction within at least one other angular range, a portion of which overlaps with the first angular range; and judging means, for judging that the partial image includes a face facing a direction within a specific angular range, which is the first angular range from which the portion that overlaps with the at least one angular range corresponding to the at least one other classifier has been removed, in the case that partial image is judged to include a face facing a direction within the first angular range and judged not to include a face within the other angular range.

A program of the present invention is a program that causes a computer to function as a specific facing direction face detecting apparatus for detecting faces facing specific directions by employing classifiers that judge whether judgment target images include faces facing directions within angular ranges corresponding to predetermined angular ranges, generated by a machine learning technique employing a plurality of sample images that include faces having different shapes and facing directions within the predetermined angular ranges, the program causing the computer to function as:

partial image cutout means, for cutting out a partial image from an input image;

a first classifier, for judging whether the partial image includes a face facing a direction within a first angular range;

at least one other classifier, for judging whether the partial image includes a face facing a direction within at least one other angular range, a portion of which overlaps with the first angular range; and judging means, for judging that the partial image includes a face facing a direction within a specific angular range, which is the first angular range from which the portion that overlaps with the at least one angular range corresponding to the at least one other classifier has been removed, in the case that partial image is judged to include a face facing a direction within the first angular range and judged not to include a face within the other angular range.

In the present invention, the at least one other classifier may be a second classifier for judging whether an image includes a face facing a direction within a second angular range that overlaps with one end of the first angular range; and the specific angular range may be the first angular range, from which the portion that overlaps with the second angular range has been removed.

In the present invention, the at least one other classifier may be a second classifier for judging whether an image includes a face facing a direction within a second angular range that overlaps with one end of the first angular range, and a third classifier for judging whether an image includes a face facing a direction within a third angular range that overlaps with the other end of the first angular range; and the specific angular range may be the first angular range, from which the portions that overlap with the second angular range and the third angular range have been removed.

The present invention employs a plurality of classifiers which are capable of detecting faces having different shapes and have wide detectable ranges with respect to facing directions, as illustrated in FIG. 15C. Thereby, a degree of tolerance that enables detection of faces having different shapes is maintained, while faces facing directions within a range narrower than the detectable range of any one classifier can be detected. That is, a high detection rate and highly discriminatory detection are achieved simultaneously.

A neural network method, a boosting method and the like are examples of the machine learning method. In the present invention, the boosting method is preferred.

The "facing directions" refer to directions that the faces face in out-of-plane (not within the plane of the image) directions. In other words, the directions are those in the directions that faces face when persons shake their heads from side to side.

Note that the program of the present invention may be provided being recorded on a computer readable medium. Those who are skilled in the art would know that computer readable media are not limited to any specific type of device, and include, but are not limited to: floppy disks, CD's, RAM's, ROM's, hard disks, magnetic tapes, and internet downloads, in which computer instructions can be stored and/or transmitted. Transmission of the computer instructions through a network or through wireless transmission means is also within the scope of the present invention. Additionally, computer instructions include, but are not limited to: source, object, and executable code, and can be in any language, including higher level languages, assembly language, and machine language.

According to the method, apparatus and program for detecting faces facing specific directions, the classifiers are generated by a machine learning method employing sample images that include faces having different shapes and facing directions within the predetermined angular ranges. A plurality of classifiers having a degree of tolerance capable of detecting faces having different shapes and wide angular ranges of detectable facing directions are prepared such that the angular ranges of detectable directions partially overlap. The plurality of classifiers are applied to perform judgment with respect to the partial images cut out from the input image. Based on the judgment results of each of the classifiers, whether the partial images include a face facing a direction within an angular range of any one of the classifiers with the overlapping portions removed therefrom is judged. Therefore, a degree of tolerance that enables detection of faces having different shapes is maintained, while faces facing directions within a range narrower than the detectable range of any one classifier can be detected. That is, a high detection rate and highly discriminatory detection can be simultaneously achieved, when detecting faces facing specific directions from within images.

BRIEF DESCRIPTION OF THE DRAWINGS

FIG. 1 is a block diagram that illustrates the construction of a specific facing direction face detecting system 1, which is an embodiment of the present invention.

FIG. 2 is a diagram that illustrates an example of a conversion curve which is employed in a global normalizing process.

FIG. 13 is a diagram that illustrates how judgment is made regarding whether a face is facing a direction within a specific angular range, based on judgment results of classifiers.

FIGS. 15A, 15B and 15C are conceptual diagrams that illustrate the relationship between detection rates and the discriminatory nature of detection.

FIGS. 16A and 16B are diagrams that illustrate relationships between detectable angular ranges of facing directions for classifiers and the facing directions of faces which are actually detected.

DESCRIPTION OF THE PREFERRED EMBODIMENTS

Figure 3:
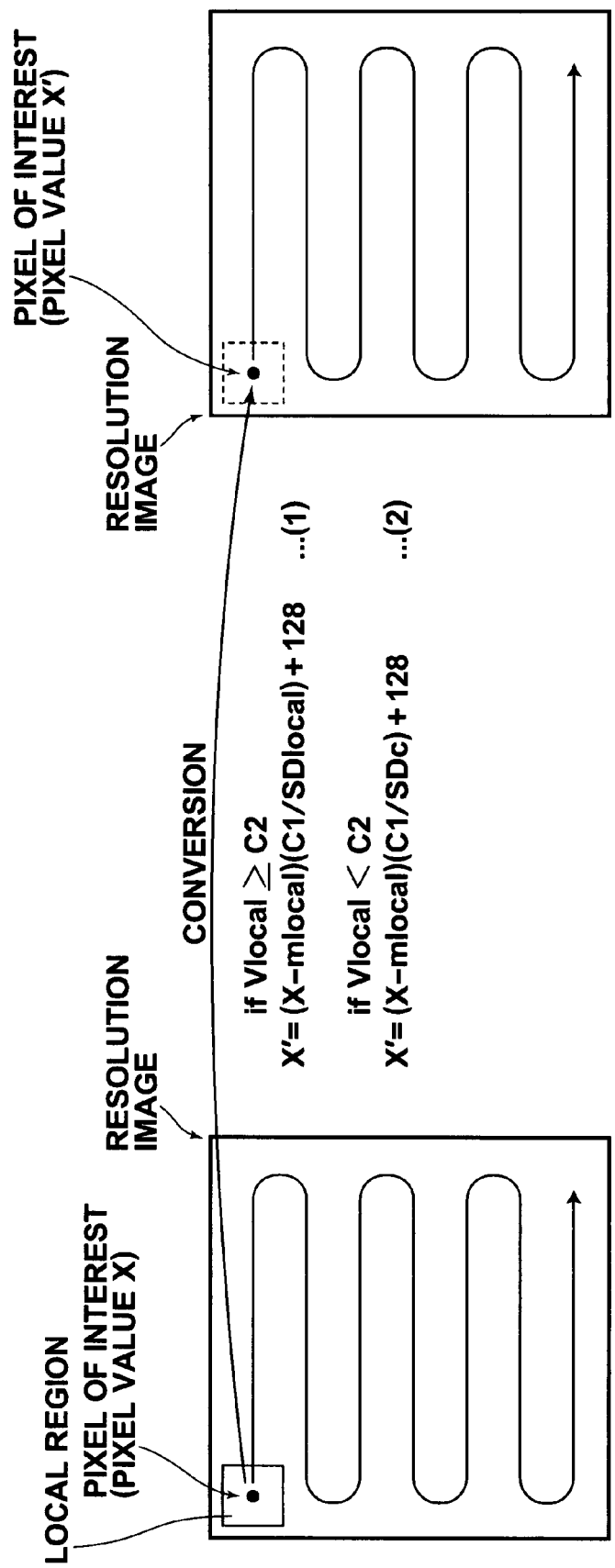
FIG. 3 is a diagram that illustrates the concept of a local region normalizing process.

Hereinafter, an embodiment of the present invention will be described with reference to the attached drawings.

FIG. 1 is a schematic block diagram that illustrates the construction of a specific facing direction face detecting system 1 according to an embodiment of the present invention. As illustrated in FIG. 1, the specific facing direction face detecting system 1 comprises: an image normalizing section 10; a subwindow setting section 20 (partial image cutout means); a forward facing face classifier 31 (first classifier); a rightward obliquely facing face classifier 32 (second classifier); a leftward obliquely facing face classifier 33 (third classifier); and a specific facing direction face judging section 40 (judging means).

The image normalizing section 10 administers normalizing processes on input images S0, such that the contrast therein is suitable for face detection, and obtains normalized images S1. The normalizing processes comprise a global normalizing process and a local normalizing process.

First, the global normalizing process will be described. The global normalizing process converts the pixel values of images which are targets of detection (hereinafter, referred to as "detection target images"), according to a conversion curve that causes the pixel values of the entirety of the input images S0 to approach values that represent the logarithms of the brightness of the subject therein. The pixel values are converted such that the contrast of the resolution images approach a predetermined level that maximizes the performance of the classifiers, to be described later.

FIG. 2 illustrates an example of a conversion curve which is employed in the global normalizing process. The global normalizing process may administer inverse gamma conversion (multiply by 2.2) on the pixel values within an sRGB space, then take the logarithms of the pixel values according to the conversion curve (look up table) of FIG. 2. This process is administered for the following reasons.

Optical intensities I, which are observed as an image, are expressed as products of the reflectance R of a subject and the intensity L of a light source (I=R×L). Accordingly, if the intensity L of the light source changes, the optical intensities I, which are observed as the image, also change. However, if only the reflectance R of the subject is evaluated, then face discrimination that does not depend on the intensity L of the light source, that is, face discrimination, which is not influenced by the brightness of an image, can be performed.

Here, in the case that the intensity of a light source is designated as L, the optical intensity observed at a portion of a subject having a reflectance R1 is designated as I1, and the optical intensity observed at a portion of the subject having a reflectance R2 is designated as I2, the logarithms of each of the values satisfy the following equation:

$$\begin{aligned} \text{Log}(I1) - \log(I2) &= \log(R1 \times L) - \log(R2 \times L) \\ &= \log(R1) + \log(L) - (\log(R2) + \log(L)) \\ &= \log(R1) - \log(R2) \\ &= \log(R1/R2) \end{aligned} \quad (1)$$

That is, by administering logarithmic conversion on pixel values of an image, the pixel values are converted into a space in which the ratio of reflectances is expressed as differences. In this type of space, it becomes possible to evaluate only the reflectance of a subject, independent of the intensity L of a light source. In other words, contrast, which differs due to brightness within the image, can be matched.

Meanwhile, the color space of images obtained by devices such as digital cameras is generally an sRGB color space. sRGB is an internationally standardized color space, in which colors and chromas are defined, in order to eliminate differences in color reproduction among devices. In this color space, appropriate color reproduction is enabled in image output devices having gamma values (γ out) of 2.2. Therefore, the pixel values of images are multiplied by 1/γ out (=0.45).

Therefore, the pixel values of the pixels within the entirety of the image are converted according to the conversion curve that administers inverse gamma conversion on the pixel values, that is, multiplies the pixel values by 2.2, then takes the logarithms thereof. Thereby, it becomes possible to evaluate only the reflectance of a subject, independent of the intensity of a light source.

Note that this type of global normalizing process can be said to be a process that converts the pixel values of pixels within the entirety of an image according to a conversion curve that converts the pixel values from those of a specific color space to those of a different color space.

By administering such a process on the detection target image, contrast, which differs according to brightness within images, can be matched, and the accuracy of judgment by the classifiers is improved. Note that judgment results of images which have undergone the global normalizing process are likely to be influenced by oblique light and backgrounds within detection target images and the input modalities thereof. However, the processing time required for the global normalizing process is short.

Next, the local normalizing process will be described. The local normalizing process suppresses fluctuations in contrast within local regions within detection target images. The local normalizing comprises a first brightness gradation converting process and a second brightness gradation converting process. The first brightness gradation converting process causes degrees of variance of pixel values representing brightness to approach a first predetermined level, which is higher than a second predetermined level, within local regions of the detection target images in which the degrees of variance are greater than or equal to the second predetermined level. The second brightness gradation converting process suppresses degrees of variance of pixel values representing brightness to less than the first predetermined level within local regions of the detection target images in which the degrees of variance are less than to the second predetermined level. Note that the local normalizing process requires a long processing time, but judgment results of images which have undergone the local normalizing process are not likely to be influenced by oblique light and backgrounds within detection target images or the input modalities thereof.

Figure 4:
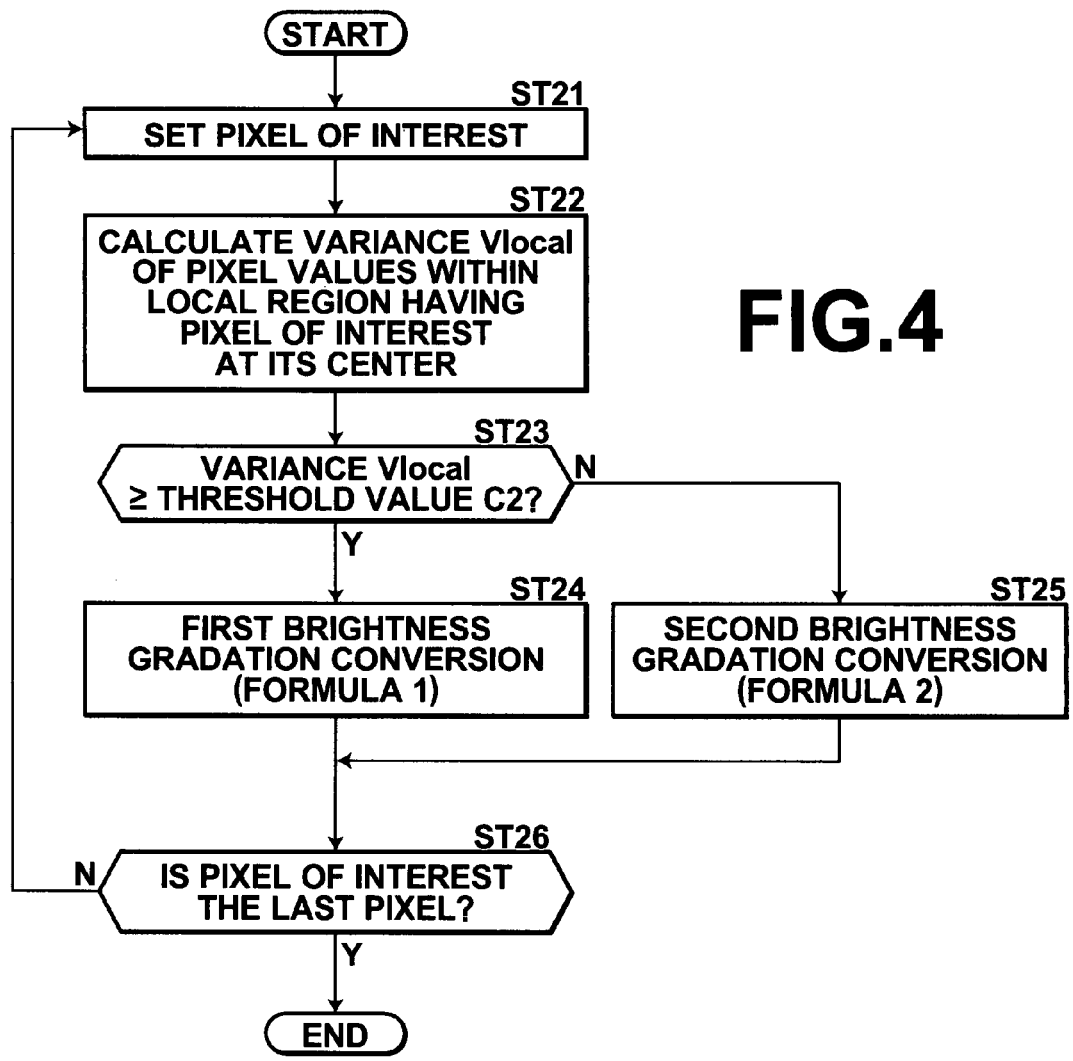
FIG. 4 is a flow chart that illustrates the steps performed in the local region normalizing process.

FIG. 3 is a diagram that illustrates the concept of the local region normalizing process, and FIG. 4 is a flow chart that illustrates the steps of the local normalizing process. Formulas (2) and (3) are formulas for converting the gradations of pixel values in the local region normalizing process.

If Vlocal≧C2

$$X'=(X-m\text{local})(C1/SD\text{local})+128 \quad (2)$$

If Vlocal<C2

$$X'=(X-m\text{local})(C1/SDc)+128 \quad (3)$$

wherein:
X: pixel value of a pixel of interest;
X': pixel value after conversion;
mlocal: mean pixel value within a local region having the pixel of interest as its center;
Vlocal: variance of pixel values within the local region;
Sdlocal: standard deviation of pixel values within the local region;
(C1×C1): reference value;
C2: threshold value; and
SDc: constant Here, X represents the pixel value of a pixel of interest; X' represents the pixel value of the pixel of interest after conversion; mlocal represents a mean pixel value within a local region having the pixel of interest as its center; Vlocal represents the variance of pixel values within the local region; SD local represents the standard deviation of pixel values within the local region; (C1×C1) represents a reference value that corresponds to the first predetermined level; C2 represents a threshold value that corresponds to the second predetermined level; and SDc is a predetermined constant. Note that the number of brightness gradations is expressed as 8 bit data, and that the pixel values range from 0 to 255 in the present embodiment.

As illustrated in FIG. 3, the image normalizing section 10 first sets a pixel within a detection target image as a pixel of interest (step ST1). Next, the variance Vlocal, among pixel values within a local region of a predetermined size, for example, 11×11 pixels, having the pixel of interest at its center, is calculated (step ST2). Then, it is judged whether the calculated variance Vlocal is greater than or equal to a threshold value C2 that corresponds to the second predetermined level (step ST3). In the case that the discrimination results of step ST3 indicate that the variance Vlocal is greater than or equal to the threshold value C2, the first brightness gradation converting process is administered according to Formula (2) (step ST4). The first brightness gradation converting process causes the difference between the pixel value X of the pixel of interest and the mean value mlocal to become smaller, as the difference between the variance Vlocal and the reference value (C1×C1) corresponding to the first predetermined level become greater when the variance Vlocal is greater than the reference value, and causes the difference between the pixel value X of the pixel of interest and the mean value mlocal to become greater, as the difference between the variance Vlocal and the reference value (C1×C1) become greater when the variance Vlocal is less than the reference value. On the other hand, in the case that the variance Vlocal is judged to be less than the threshold value C2, a linear gradation conversion, which does not depend on the variance Vlocal, is administered according to Formula (3), as the second brightness gradation converting process (step ST5). Thereafter, it is judged whether the pixel of interest set in step ST1 is the last pixel (step ST6). If it is judged that the pixel of interest is not the last pixel in step ST6, the process returns to step ST1, and a next pixel within the resolution image is set as the pixel of interest. On the other hand, if it is judged that the pixel of interest is the last pixel in step ST6, the local normalizing process for the resolution image ends. By repeating the processes performed in steps ST1 through ST6 in this manner, a detection target image, on the entirety of which the local region normalizing process has been administered, is obtained.

Note that the second predetermined level may be varied according to the brightness of the entirety or a portion of the local regions. For example, the threshold value C2 may be varied according to the pixel value of the pixel of interest. That is, the threshold value C2 corresponding to the second predetermined level may be set to be high when the brightness of the pixel of interest is relatively high, and set low when the brightness of the pixel of interest is relatively low. By setting the threshold value C2 in this manner, faces, which are present within regions having low brightness, that is, dark regions with low contrast (a state in which the variance of pixel values is low) can also be correctly normalized.

The subwindow setting section 20 sequentially sets subwindows for cutting out partial images W of a predetermined size, for example, 32×32 pixels, while moving the position of the subwindow with a predetermined pitch, for example, 2 pixels, along a predetermined line. The subwindow setting section 20 outputs the cut out partial images W to the forward facing face classifier 31, the rightward obliquely facing face classifier 32, and the leftward obliquely facing face classifier 33.

Figure 5:
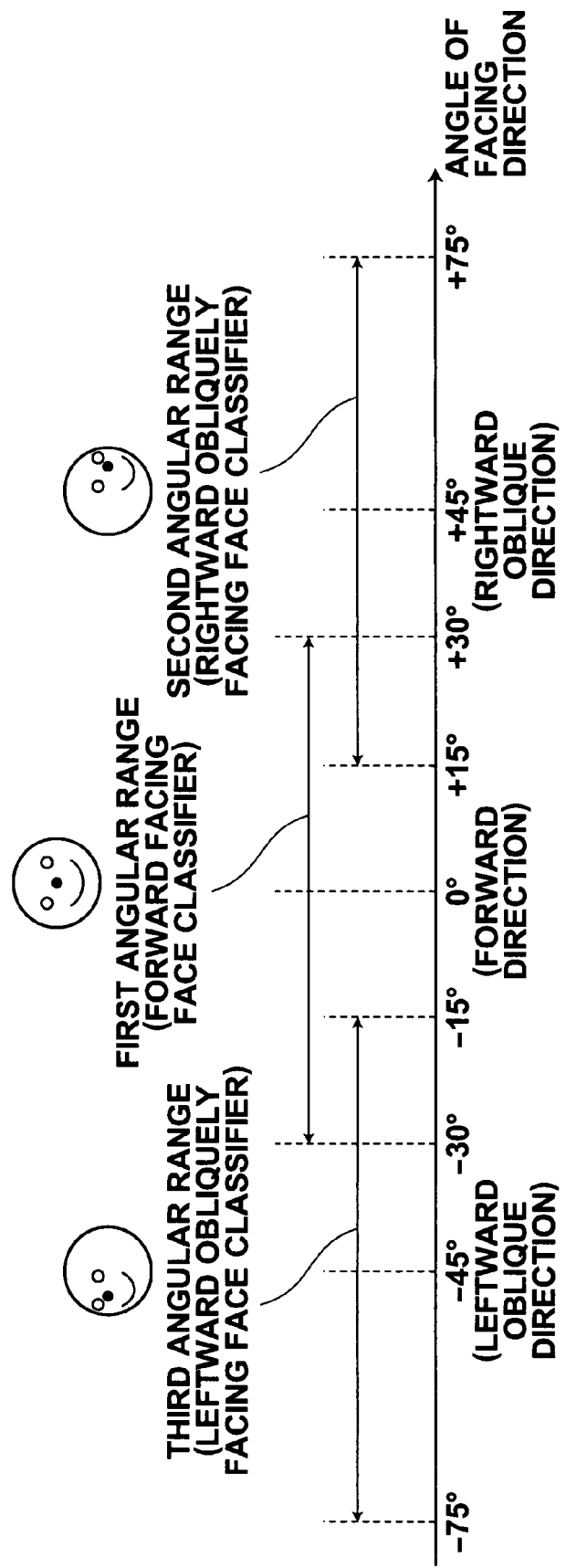
FIG. 5 is a diagram that illustrates the detectable angular ranges of facing directions for each classifier of the present embodiment.

The forward facing face classifier 31, the rightward obliquely facing face classifier 32, and the leftward obliquely facing face classifier 33 respectively judge whether the partial images W includes a face facing a direction within the angular range corresponding thereto. FIG. 5 illustrates the detectable angular ranges of facing directions for each classifier of the present embodiment. The forward facing face classifier judges whether partial images W include faces facing directions within an angular range of −30° to +30° (first angular range), with faces facing straight forward being set as a reference at 0°. The rightward obliquely facing face classifier 32 judges whether partial images W include faces facing directions within an angular range of +15° to +75° (second angular range). The leftward obliquely facing face classifier 33 judges whether partial images W include faces facing directions within an angular range of −15° to −75° (third angular range). The detectable angular ranges of facing directions for the forward facing face classifier 31 and the rightward obliquely facing face classifier 32 overlap over a range of +15° to +30°. The detectable angular ranges of facing directions for the forward facing face classifier 31 and the leftward obliquely facing face classifier 32 overlap over a range of −15° to −30°.

Next, the construction of each classifier, the processes performed by each classifier, and the learning method of the classifiers will be described.

Figure 6:
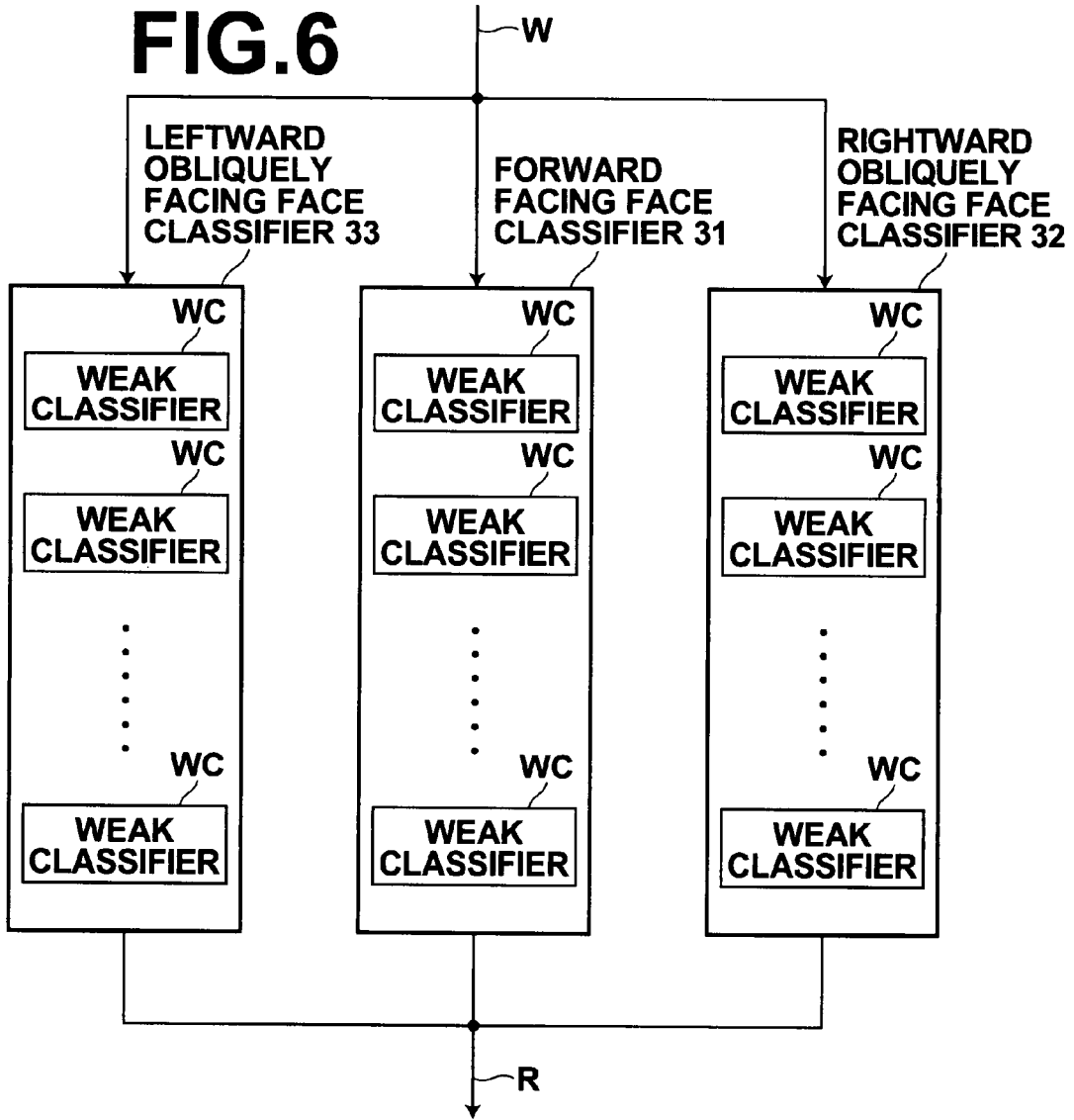
FIG. 6 is a block diagram that illustrates the construction of a classifier.

As illustrated in FIG. 6, each classifier comprises a plurality of weak classifiers WC, which have been selected from a great number of weak classifiers WC by a learning process to be described later, and are effective in judgment. Each of the weak classifiers WC calculates characteristic amounts from partial images W according to a unique predetermined algorithm. Scores scw that represent the probability that a partial image W includes faces facing a predetermined direction are calculated, based on the characteristic amounts and individual histograms that function as score tables, to be described later. The classifier obtains the score sc by totaling the scores scw obtained by the plurality of weak classifiers WC. The classifier judges that the partial image W includes a face facing a direction within the angular range corresponding thereto when the score sc is greater than or equal to the threshold value Th1, and a judgment result R is output.

Figure 7:
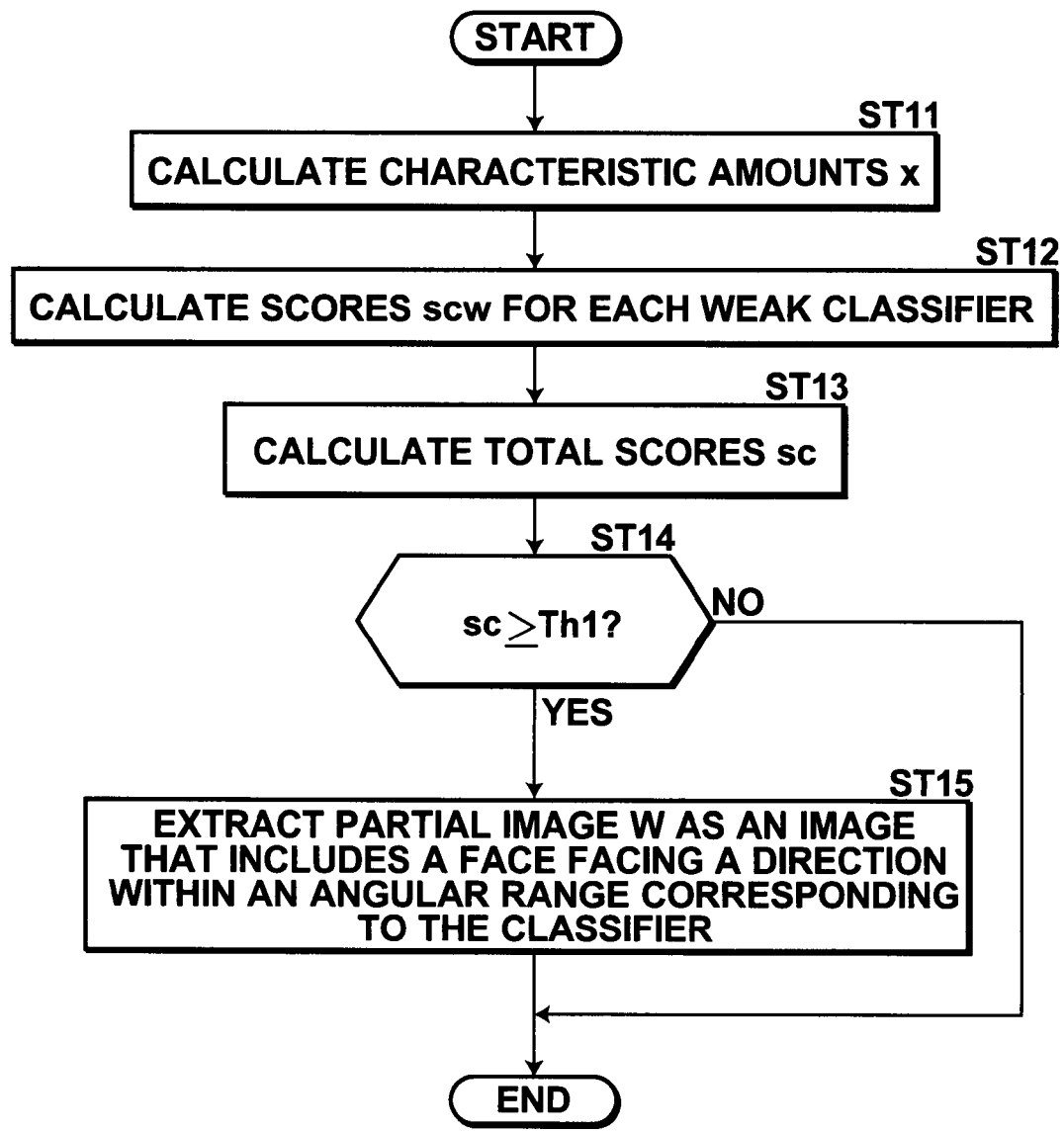
FIG. 7 is a flow chart that illustrates the processes performed by a single classifier.
Figure 8:
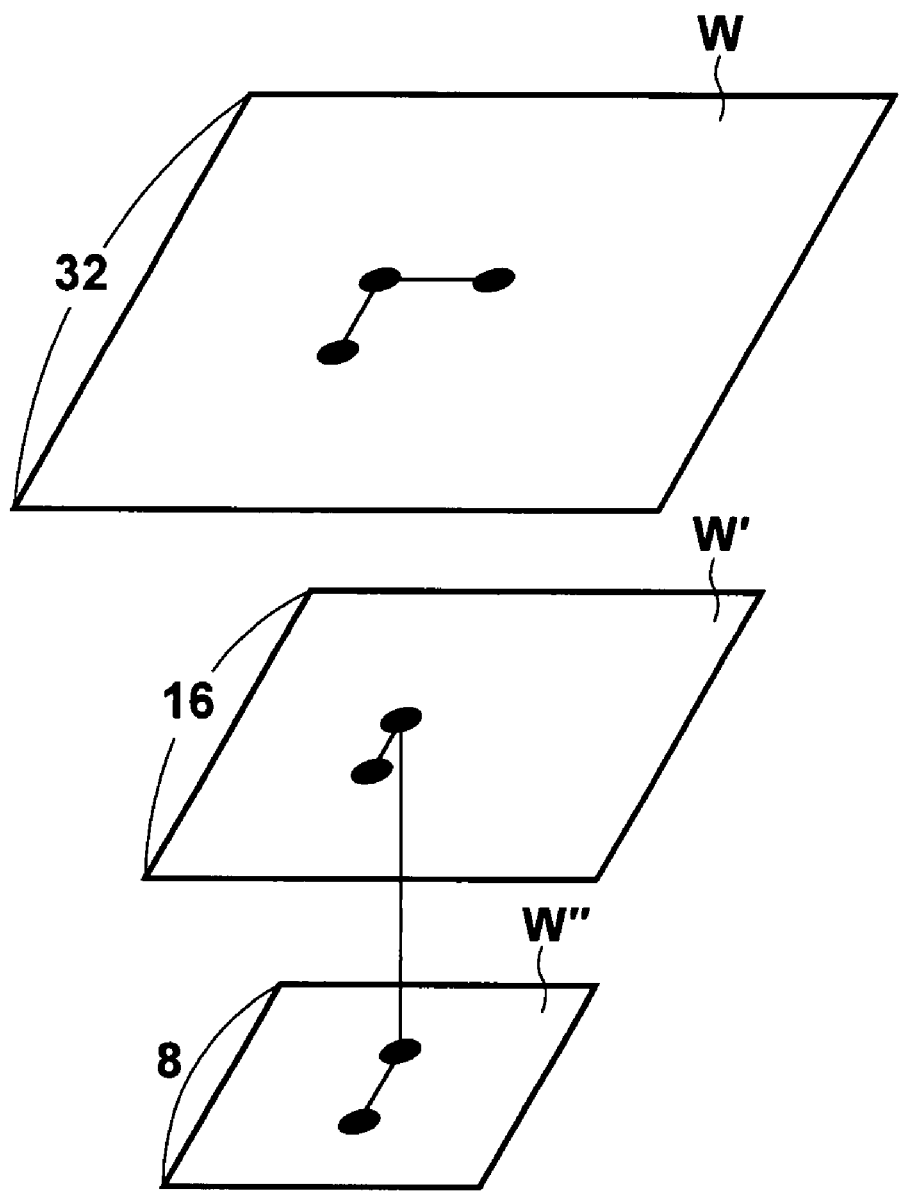
FIG. 8 is a diagram for explaining how a weak classifier calculates characteristic amounts.

FIG. 7 is a flow chart that illustrates the processes performed by a single classifier. When a partial image W is input to the classifier, the plurality of weak classifiers WC calculate different types of characteristic amounts x, respectively (step ST11). For example, a 16×16 pixel size image W' and an 8×8 pixel size image W" are obtained as illustrated in FIG. 8, by administering a four neighboring pixel average process on the partial image W, which is a 32×32 pixel size image, twice. The four neighboring pixel average process sections the partial image into 2×2 pixel blocks, and assigns the average pixel values of the four pixels within the blocks as the pixel value of pixels that correspond to the blocks. Pairs of points are set within the three images. The differences between the pixel values (brightness values) of points of each pair within a pair group constituted by a plurality of different types of pairs are calculated, and the combinations of the differences are designated to be the characteristic amounts. The two points that constitute each pair may be two predetermined points which are aligned in the vertical direction or the horizontal direction so as to reflect density characteristics of faces within images. A value x corresponding to the combinations of the differences is calculated. Then, a score scw corresponding to the value x that represents the probability that the partial image W includes a face to be discriminated by the classifier is calculated for each weak classifier, by referring to a predetermined score table (the individual histogram) (step ST12). For example, in the case of the forward facing face classifier 31, the score scw represents the probability that the partial image W includes a face facing a direction within the angular rage of −30° to +30°. The scores scw, which have been calculated for each weak classifier WC, are totaled to obtain a score sc (step ST13). Whether the score sc is greater than or equal to the threshold value Th1 is judged (step ST14). In the case that the result of judgment in step ST14 is affirmative, it is judged that the partial image W includes a face facing a direction within an angular range corresponding to the classifier (step ST15).

Next, the learning method (generation method) of the classifiers will be described.

Figure 9:
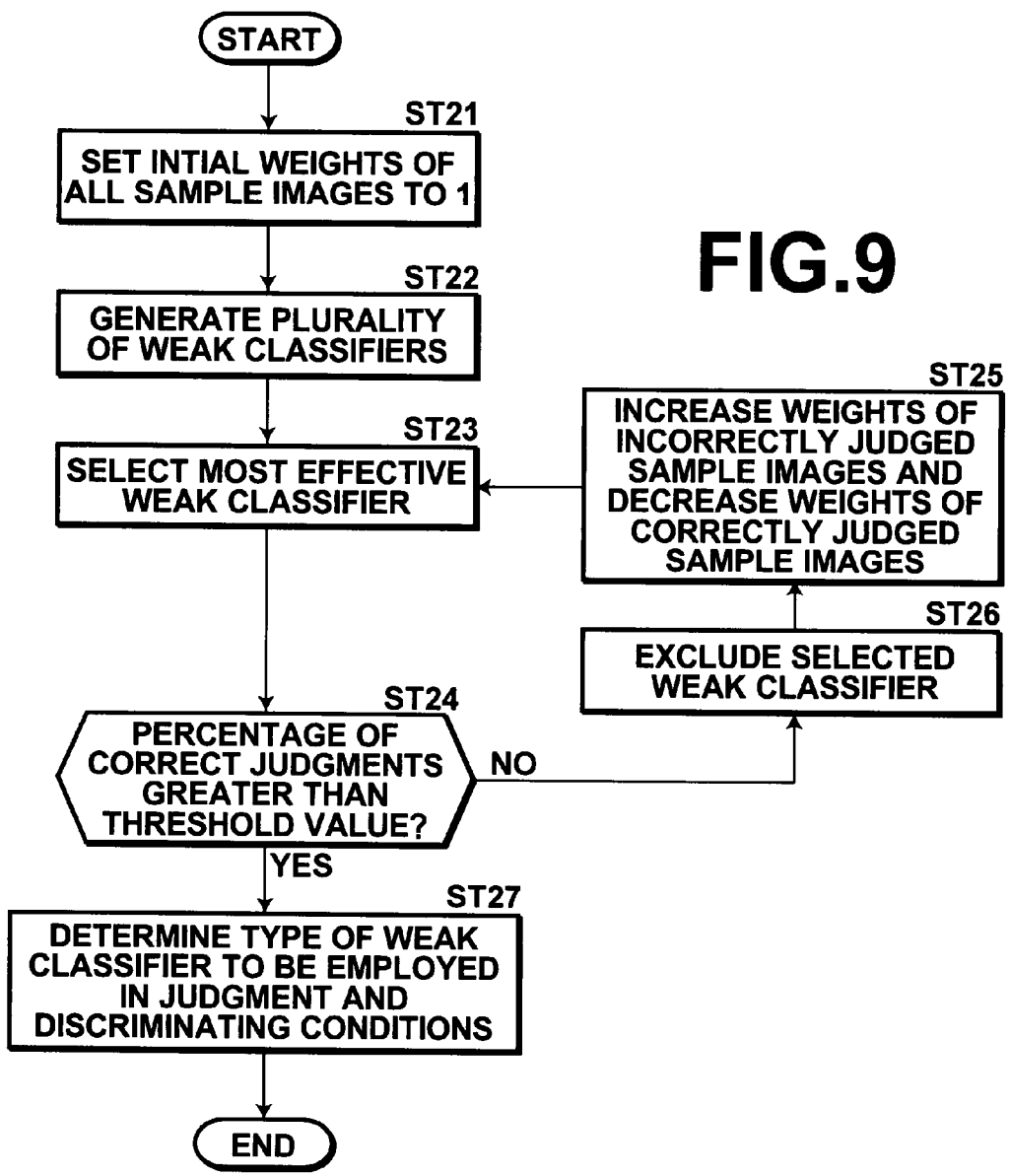
FIG. 9 is a flow chart that illustrates the learning method of a classifier.

FIG. 9 is a flow chart that illustrates the learning method of a classifier. Sample images, which are normalized to a predetermined size, 32×32 pixels, for example, and which have undergone processes similar to the normalizing processes administered by the image normalizing section 20, are employed in the learning of the classifier. A plurality of different sample images of faces (face sample image group) facing a predetermined direction corresponding to the classifier and a plurality of non face images that do not include faces (non face sample image group) are prepared.

In the face sample image group, variations of each facial sample image are employed. That is, the vertical and/or horizontal dimensions of each sample image are enlarged/reduced at 0.1× increments within a range of 0.7× to 1.2×. In addition, each of the enlarged/reduced sample images is also rotated in three degree increments within a range of ±15 degrees within the planes thereof. Thereby, the classifier can have a degree of tolerance with respect to inclinations of faces and changes in the shapes of faces. That is, faces, which are classifiable by the classifier, can have a certain degree of tolerance with respect to inclinations and changes in the shapes thereof.

Figure 10:
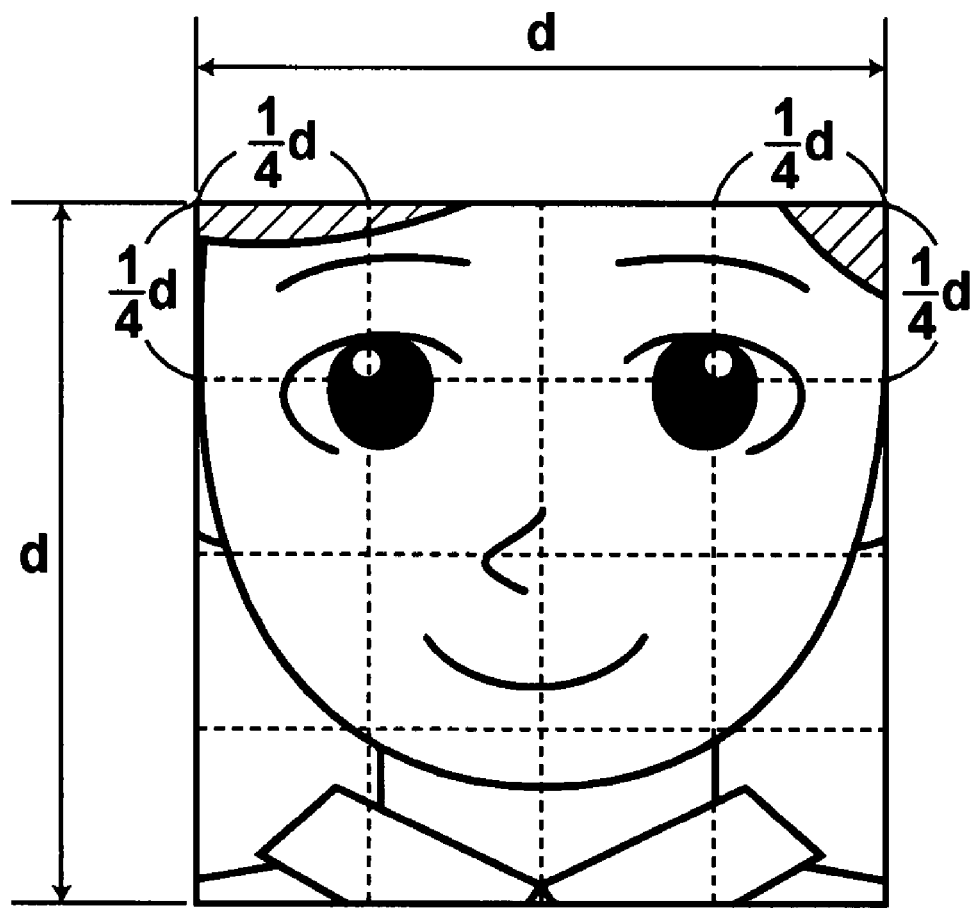
FIG. 10 is a diagram that illustrates a sample image of a face, in which the positions of the eyes are normalized to predetermined positions.

Note that at this time, the sizes and positions of the sample images of faces are standardized such that the eyes therein are at predetermined positions. The enlargement/reduction and rotation are performed with the positions of the eyes as the reference points. For example, in the case of a sample image in which a forward facing face is pictured, the size and the position of the face are standardized such that the positions of the eyes are d/4 down and d/4 toward the interior from the upper left and upper right corners of the image, as illustrated in FIG. 10. The rotation and enlargement/reduction are performed with the center point between the eyes as the center of the image.

Each sample image is weighted, that is, assigned a level of importance. First, the initial values of weighting of all of the sample images are set equally to 1 (step ST21).

Next, weak classifiers are generated for each of a plurality of different pair groups, constituted by pairs of points which are set within the planes of the sample images and the enlarged/reduced sample images (step ST22). Here, each weak classifier has a function of providing a reference to discriminate images of faces from those not of faces, by employing combinations of the differences between pixel values (representing brightness) of each pair of points that constitute the pair group. In the present embodiment, histograms of combinations of the differences between each pair of points that constitutes a single pair group are utilized as the bases for score tables for each weak classifier.

Figure 11:
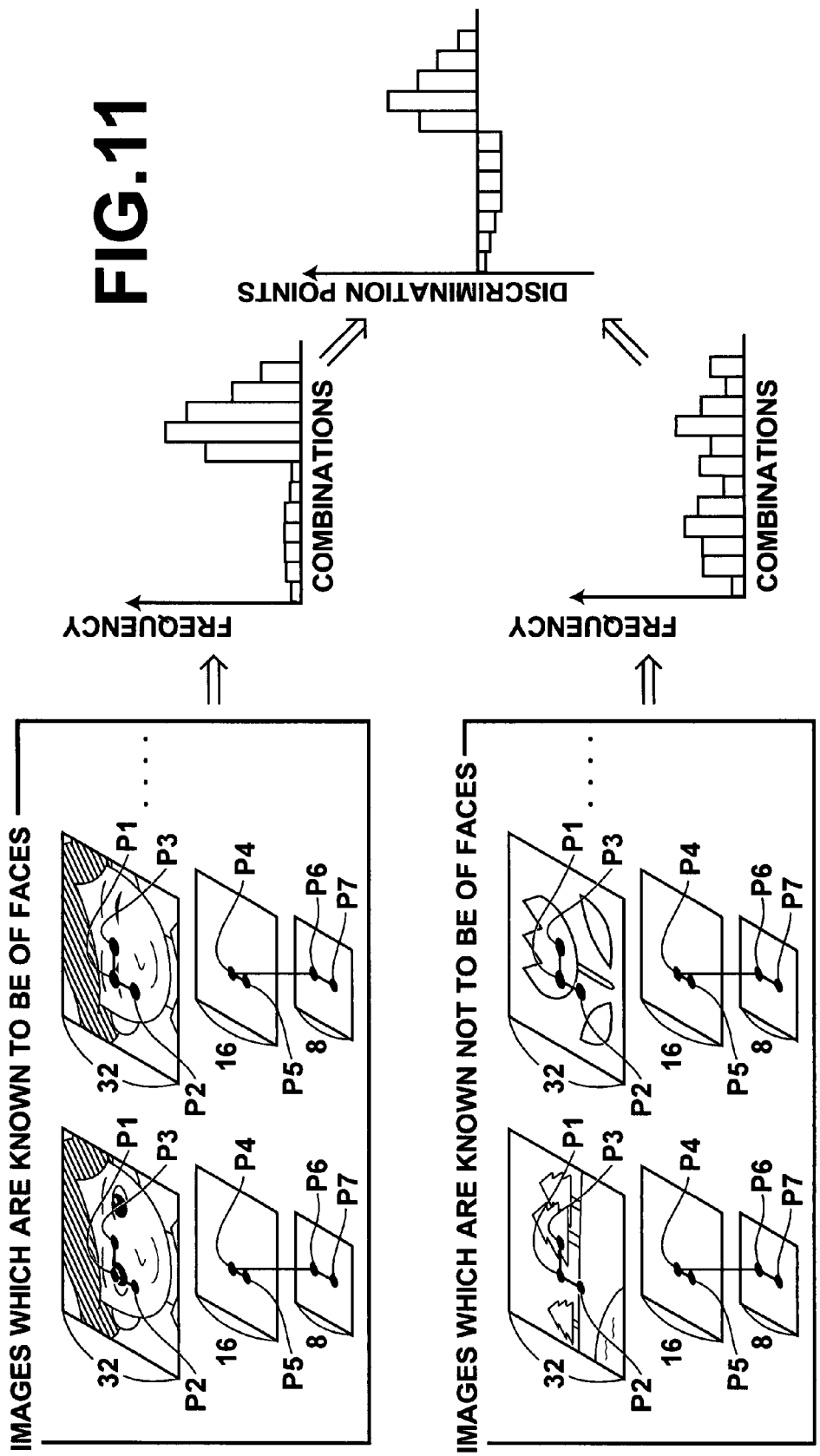
FIG. 11 is a diagram that illustrates a method by which histograms of weak classifiers are generated.

The generation of histograms from sample images will be described with reference to FIG. 11. As illustrated in the sample images at the left side of FIG. 11, the pairs of points that constitute the pair group for generating the weak classifier are five pairs, between points P1 and P2, P1 and P3, P4 and P5, P4 and P6, and P6 and P7, within sample images of the face sample image group. The point P1 is located at the center of the right eye, the point P2 is located within the right cheek, and the point P3 is located within the forehead of the sample images. The point P4 is located at the center of the right eye, and the point P5 is located within the right cheek, of a 16×16 pixel size image, obtained by administering the four neighboring pixel average process on the sample image. The point P5 is located at the center of the right eye, and the point P7 is located within the right cheek, of an 8×8 pixel size image, obtained by administering the four neighboring pixel average process on the 16×16 pixel size image. Note that the coordinate positions of the pairs of points that constitute a single pair group for generating a single weak classifier are the same within all of the sample images. Combinations of the differences between the pixel values of each of the five pairs of points that constitute the pair group are calculated for all of the sample images, and a histogram is generated. Here, the values of the combinations of differences between pixel values depend on the number of brightness gradations. In the case that the number of brightness gradations is expressed as 16 bit data, there are 65536 possible differences for each pair of pixel values. Therefore, there are 65536 to the (number of pairs) power, as total possible values of the combinations. In this case, there are $65536^5$ possible values, which would require a great number of samples, a great amount of time, and a great amount of memory to execute learning and detection. Therefore, in the present embodiment, the differences between the pixel values are sectioned at appropriate widths of numerical values, to quantify them into n values (n=100, for example). Thereby, the number of combinations of differences between pixel values becomes $n^5$, and the amount of data that represents the differences between pixel values can be reduced.

In a similar manner, histograms are generated for the plurality of sample images of the non face sample image group. Note that in the sample images of the non face sample image group, points (denoted by the same reference numerals P1 through P7) at positions corresponding to the pixels P1 through P7 of the sample images of the face sample image group are employed in the calculation of the differences between pixel values. Logarithms of the ratios of the frequencies in the two histograms are represented by the rightmost histogram illustrated in FIG. 7, which is employed as the basis for the score table of the weak classifier. The values along the vertical axis of the histogram of the weak classifier will be referred to as discrimination points. According to the weak classifier, images that have distributions of the combinations of differences between pixel values corresponding to positive discrimination points therein are highly likely to be of faces. The likelihood that an image is of a face increases with an increase in the absolute values of the discrimination points. On the other hand, images that have distributions of the combinations of differences between pixel values corresponding to negative discrimination points are highly likely to not be of faces. Again, the likelihood that an image is not of a face increases with an increase in the absolute values of the negative discrimination points. A plurality of weak classifiers are generated in histogram format regarding combinations of the differences between pixel values of pairs of the plurality of types of pair groups in step ST22.

Thereafter, a weak classifier, which is most effective in discriminating whether an image is of a face, is selected from the plurality of weak classifiers generated in step ST22. The selection of the most effective weak classifier is performed while taking the weighting of each sample image into consideration. In this example, the percentages of correct discriminations provided by each of the weak classifiers are compared, and the weak classifier having the highest weighted percentage of correct discriminations is selected (step ST23). At the first step ST23, the weighting of all of the sample images is equal, at 1. Therefore, the weak classifier that correctly discriminates whether sample images are of faces with the highest frequency is selected as the most effective weak classifier. On the other hand, the weighting of each of the sample images is renewed at step ST25, to be described later. Thereafter, the process returns to step ST23. Therefore, at the second step ST23, there are sample images weighted with 1, those weighted with a value less than 1, and those weighted with a value greater than 1. Accordingly, during evaluation of the percentage of correct discriminations, a sample image, which has a weighting greater than 1, is counted more than a sample image, which has a weighting of 1. For these reasons, from the second and subsequent step ST23's, more importance is placed on correctly discriminating heavily weighted sample images than lightly weighted sample images.

Next, confirmation is made regarding whether the percentage of correct discriminations of a combination of the weak classifiers which have been selected, that is, weak classifiers that have been utilized in combination (it is not necessary for the weak classifiers to be linked in a linear configuration in the learning stage) exceeds a predetermined threshold value (step ST24). That is, the percentage of discrimination results regarding whether sample images are of faces, which are obtained by the combination of the selected weak classifiers, that match the actual sample images is compared against the predetermined threshold value. Here, the sample images, which are employed in the evaluation of the percentage of correct discriminations, may be those that are weighted with different values, or those that are equally weighted. In the case that the percentage of correct discriminations exceeds the predetermined threshold value, whether an image is of a face can be discriminated by the selected weak classifiers with sufficiently high accuracy, therefore the learning process is completed. In the case that the percentage of correct discriminations is less than or equal to the predetermined threshold value, the process proceeds to step ST26, to select an additional weak classifier, to be employed in combination with the weak classifiers which have been selected thus far.

The weak classifier, which has been selected at the immediately preceding step ST23, is excluded from selection in step ST26, so that it is not selected again.

Next, the weighting of sample images, which were not correctly discriminated by the weak classifier selected at the immediately preceding step ST23, is increased, and the weighting of sample images, which were correctly discriminated, is decreased (step ST25). The reason for increasing and decreasing the weighting in this manner is to place more importance on images which were not correctly discriminated by the weak classifiers that have been selected thus far. In this manner, selection of a weak classifier which is capable of correctly discriminating whether these sample images are of a face is encouraged, thereby improving the effect of the combination of weak classifiers.

Thereafter, the process returns to step ST23, and another effective weak classifier is selected, using the weighted percentages of correct discriminations as a reference.

The above steps ST23 through ST26 are repeated to select weak classifiers corresponding to combinations of the differences between pixel values for each pair that constitutes specific pair groups, which are suited for discriminating whether faces are included in images. If the percentages of correct discriminations, which are evaluated at step ST24, exceed the threshold value, the type of weak classifier and discrimination conditions, which are to be employed in discrimination regarding whether images include faces, are determined (step ST27), and the learning process is completed. In addition, a score table, for calculating scores according to combinations of differences between pixel values, is generated for each weak classifier, based on the histograms therefor. Note that the histograms themselves may be employed as the score tables. In this case, the discrimination points of the histograms become the scores.

Figure 12:
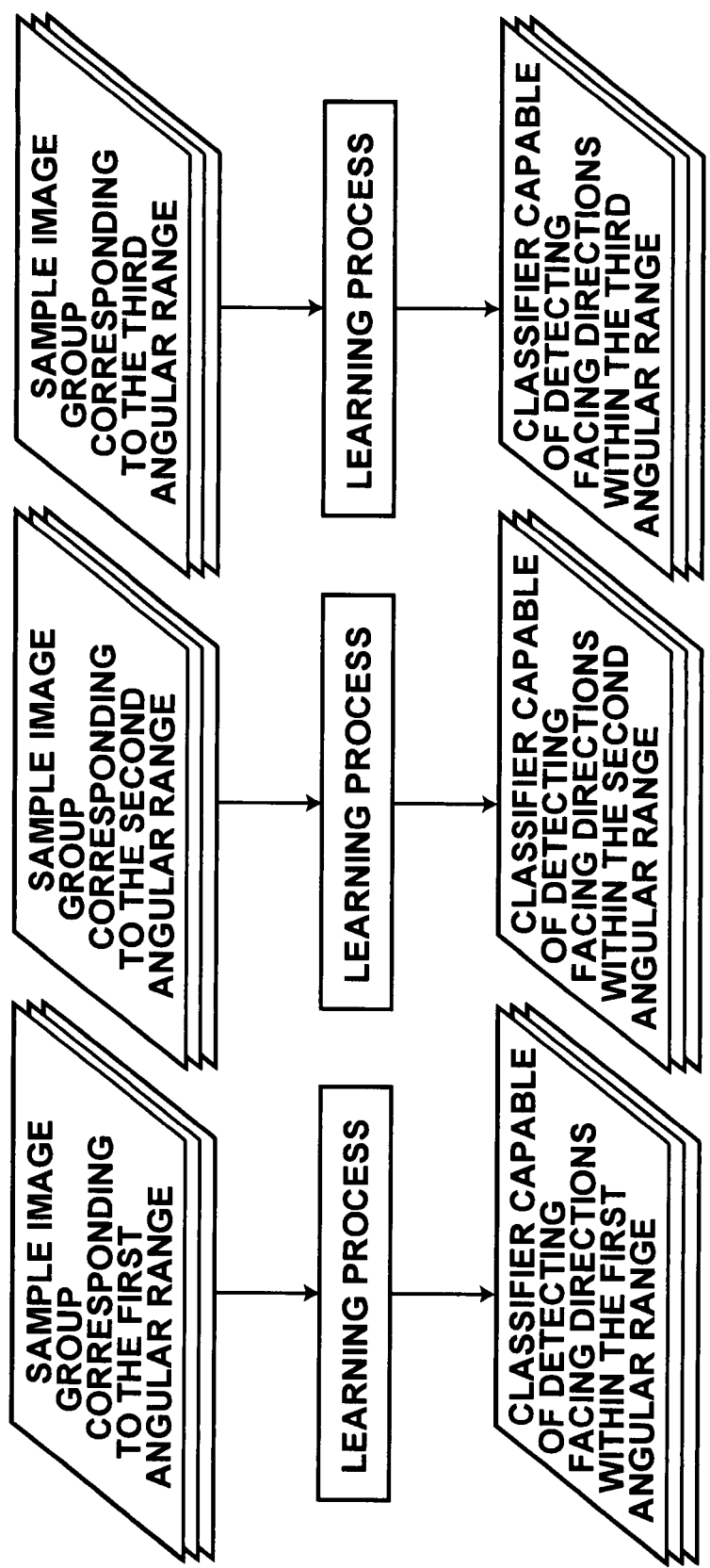
FIG. 12 is a diagram that illustrates the concept behind generating a plurality of classifiers, each of which are capable of detecting faces facing directions within different angular ranges.

In this manner, the classifier is generated by learning employing the face sample image group and the non face sample image group. As mentioned previously, in order to generate the plurality different of classifiers for detecting facing directions within each of the angular ranges as illustrated in FIG. 12, face sample image groups must be prepared corresponding to each of the angular ranges. Then, learning is performed employing each of the face sample groups and the non face sample image group. That is, in the present embodiment, three different face sample image groups corresponding to the angular ranges of −30° to +30°, +15° to +75°, and −15° to −75° are prepared. Then, the aforementioned learning is performed employing each of the face sample image groups and the non face sample image group, to generate each of the three classifiers 31 through 33.

Note that in the case that the learning technique described above is applied, the weak classifiers are not limited to those in the histogram format. The weak classifiers may be of any format, as long as they provide references to discriminate between images of faces and other images by employing combinations of the differences between pixel values of each pair that constitutes specific pair groups. Examples of alternative weak classifiers are: binary data, threshold values, functions, and the like. As a further alternative, a histogram that represents the distribution of difference values between the two histograms illustrated in the center of FIG. 11 may be employed, in the case that the weak classifiers are of the histogram format.

The learning technique is not limited to the boosting method which has been described above. Other machine learning techniques, such as a neural network method, may be employed.

As illustrated in FIG. 13, the specific facing direction face judging section 40 judges that a partial image W includes a face facing a direction within a specific angular range, which is the first angular range from which the portions that overlap with the second and third angular ranges are removed, if the forward facing face classifier 31 judges that the partial image W includes a face facing a direction within the first angular range, the rightward obliquely facing face classifier 32 judges that the partial image W does not include a face facing a direction within the second angular range, and the leftward obliquely facing face classifier 33 judges that the partial image W does not include a face facing a direction within the third angular range. For all other combinations of judgment results, the specific facing direction face judging section 40 judges that a partial image W does not include a face facing a direction within the specific angular range. That is, it is judged that a partial image W includes a face, and that the facing direction of the face is within the first angular range of −30° to +30°, by the affirmative judgment result of the forward facing face classifier 31. Then, it is judged that the facing direction is not within the second and third angular ranges of +15° to +75° and −15° to −75°, by the negative judgment results of the rightward obliquely facing face classifier 32 and the leftward obliquely facing face classifier 33. Accordingly, the specific facing direction face judging section 40 judges that the partial image W includes a face facing a direction within an angular range of −15° to +15°.

Next, the flow of processes performed by the specific facing direction face detecting system 1 will be described.

Figure 14:
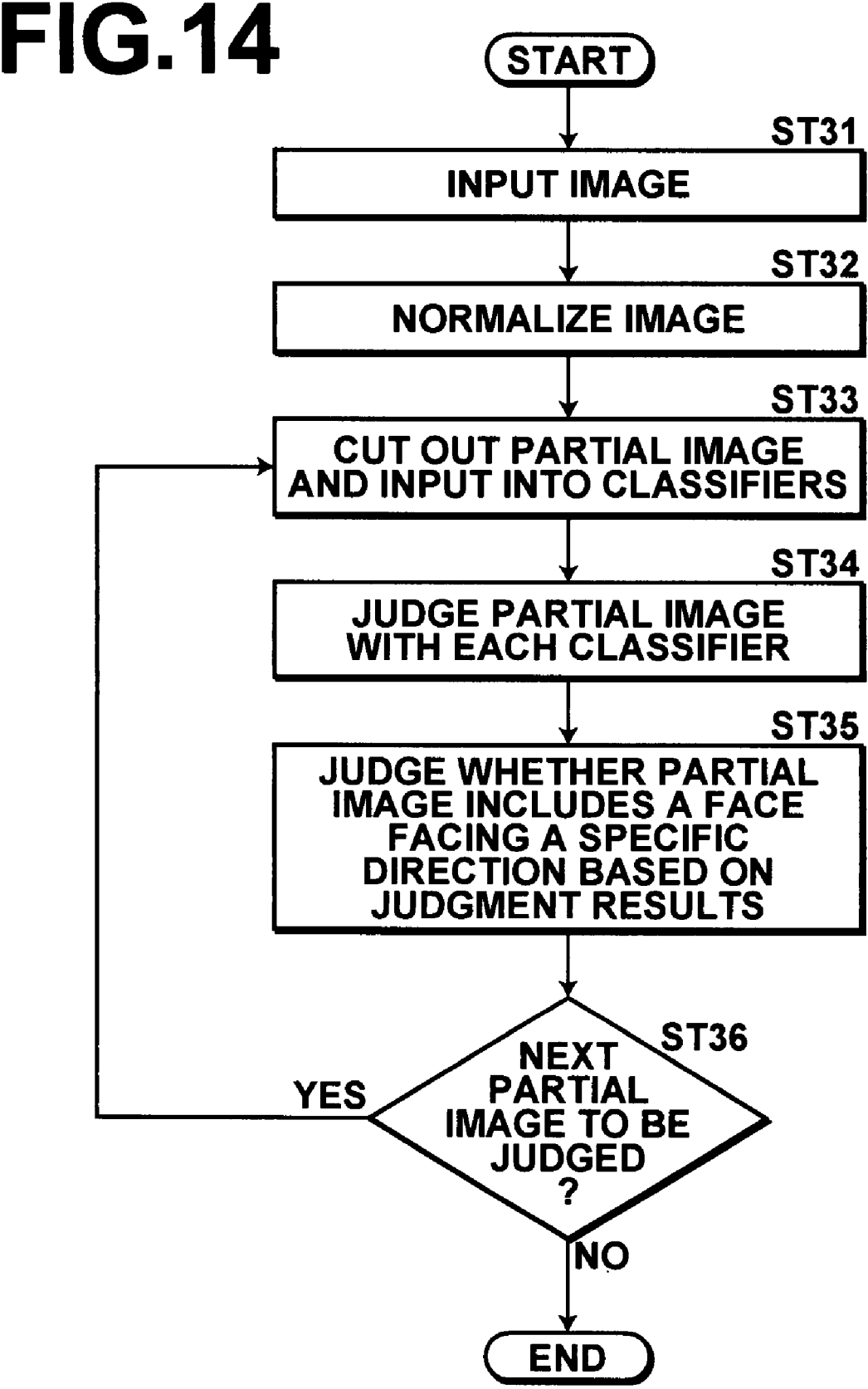
FIG. 14 is a flow chart that illustrates the processes performed by the specific facing direction face detecting system 1.

FIG. 14 is a flow chart that illustrates the processes performed by the specific facing direction face detecting system 1. As illustrated in FIG. 14, first, the an image S0 is input to the system 1 (step ST31). Then, the image normalizing section 20 administers the global normalizing process and the local normalizing process on the input image S0, to obtain a normalized image S1 (step ST32).

Next, the subwindow setting section 20 sets a subwindow at a predetermined initial position within the normalized image S1, cuts out a partial image W, and inputs the partial image W to the forward facing face classifier 31, the rightward obliquely facing face classifier 32, and the leftward obliquely facing classifier 33 (step ST33). Each classifier respectively employs the plurality of weak classifiers thereof to calculate scores sc that represent the probability that the partial image W includes a face facing a direction within the angular range corresponding thereto. In the case that the calculated score sc is greater than or equal to the threshold value Th1, it is judged that the partial image W includes a face facing a direction within the angular range corresponding to the classifier, and the judgment result R is output to the specific facing direction face detecting section 40 (step ST34).

The specific facing direction judging section 40 judges whether the partial image W includes a face facing a direction within the specific angular range, that is, the angular range of −15° to +15°, and extracts the partial image W as an image that includes a forward facing face, in the case that the judgment result is affirmative (step ST35).

After judgment is performed by the specific facing direction judging section 40, the subwindow setting section 20 judges whether a next partial image W to be judged exists (step ST36). If it is judged that a next partial image W to be judged exists, the process returns to step ST33 and another subwindow is set. If it is judged that no next partial image W to be judged exists, the face detecting process ends.

According to the specific facing direction face detecting system of the present embodiment, the classifiers are generated by a machine learning method employing sample images that include faces having different shapes and facing directions within the predetermined angular ranges. A plurality of classifiers having a degree of tolerance capable of detecting faces having different shapes and wide angular ranges of detectable facing directions are prepared such that the angular ranges of detectable directions partially overlap. The plurality of classifiers are applied to perform judgment with respect to the partial images W cut out from the input image. Based on the judgment results of each of the classifiers, whether the partial images W include faces facing directions within an angular range of any one of the classifiers with the overlapping portions removed therefrom is judged. Therefore, a degree of tolerance that enables detection of faces having different shapes is maintained, while faces facing directions within a range narrower than the detectable range of any one classifier can be detected. That is, a high detection rate and highly discriminatory detection can be simultaneously achieved, when detecting faces facing specific directions from within images.

Note that in the present embodiment, a description was given for a case in which the faces to be detected are forward facing faces. Alternatively, the specific facing direction of faces to be detected may be an oblique direction.

In addition, the sizes of faces which are detectable by the system of the present embodiment are substantially fixed. In the case that faces of various sizes are to be detected, the input images S0 may be subjected to multiple resolution processes, to generate a plurality of images having different resolutions. Then, detecting processes similar to that described in the present embodiment may be administered onto each of the plurality of generated images.

Further, in the present embodiment, the forward facing face classifier, the rightward obliquely facing face classifier, and the leftward obliquely facing face classifier are employed, and there are two overlapping portions among the detectable angular ranges of facing directions of the classifiers. Alternatively, two classifiers, such as the forward facing face classifier and the rightward obliquely facing face classifier, or the forward facing face classifier and the leftward obliquely facing face classifier, may be employed such that there is only a single overlapping portion between the detectable angular ranges of facing directions of the classifiers.

Still further, the present embodiment judges the facing direction of a face to be within an angular range of −15° to +15°, which is the detectable angular range (−30° to +30°) of the forward facing face classifier 31 from which the portions that overlap with the detectable angular ranges (+15° to +75° and −15° to −75°) of the rightward obliquely facing face classifier 32 and the leftward obliquely facing face classifier 33 are removed, if the forward facing face classifier 31 judges that the partial image W includes a face, the rightward obliquely facing face classifier 32 judges that the partial image W does not include a face, and the leftward obliquely facing face classifier 33 judges that the partial image W does not include a face, as illustrated in FIG. 16A. In actuality, however, it may be judged that the facing direction of a face is within an angular range of −15° to +30°, which is the detectable angular range (−30° to +30°) of the forward facing face classifier 31 from which the portion that overlaps with the detectable angular range (−15° to −75°) of the leftward obliquely facing face classifier 33 is removed, even in cases that the forward facing face classifier 31 judges that the partial image W includes a face, the rightward obliquely facing face classifier 32 judges that the partial image W does not include a face, and the leftward obliquely facing face classifier 33 judges that the partial image W does not include a face, as illustrated in FIG. 16B. This is because it is possible for the reliability of a classifier to be lost due to compatibility issues among the classifiers, and in this case, judgment results of the unreliable classifier are to be ignored.

A specific facing direction face detecting system according to an embodiment of the present invention has been described above. A program that causes a computer to execute the processes performed by the system is also an embodiment of the present invention. In addition, a computer readable medium having such a program recorded therein is also an embodiment of the present invention.

What is claimed is:

1. A specific facing direction face detecting method, for detecting faces facing specific directions by employing classifiers that judge whether judgment target images include faces facing directions within angular ranges corresponding to predetermined angular ranges, generated by a machine learning technique employing a plurality of sample images that include faces having different shapes and facing directions within the predetermined angular ranges, comprising the steps of:

cutting out a partial image from an input image;
judging the partial image employing a first classifier that judges whether an image includes a face facing a direction within a first angular range;
judging the partial image employing at least one other classifier that judges whether an image includes a face facing a direction within at least one other angular range, a portion of which overlaps with the first angular range; and
judging that the partial image includes a face facing a direction within a specific angular range, which is the first angular range from which the portion that overlaps with the at least one angular range corresponding to the at least one other classifier has been removed, in the case that partial image is judged to include a face facing a direction within the first angular range and judged not to include a face within the other angular range.

2. A specific direction facing face detecting method as defined in claim 1, wherein:
the at least one other classifier is a second classifier for judging whether an image includes a face facing a direction within a second angular range that overlaps with one end of the first angular range; and
the specific angular range is the first angular range, from which the portion that overlaps with the second angular range has been removed.

3. A specific direction facing face detecting method as defined in claim 1, wherein:
the at least one other classifier is a second classifier for judging whether an image includes a face facing a direction within a second angular range that overlaps with one end of the first angular range, and a third classifier for judging whether an image includes a face facing a direction within a third angular range that overlaps with the other end of the first angular range; and
the specific angular range is the first angular range, from which the portions that overlap with the second angular range and the third angular range have been removed.

4. A specific facing direction face detecting apparatus, for detecting faces facing specific directions by employing classifiers that judge whether judgment target images include faces facing directions within angular ranges corresponding to predetermined angular ranges, generated by a machine learning technique employing a plurality of sample images that include faces having different shapes and facing directions within the predetermined angular ranges, comprising:

partial image cutout means, for cutting out a partial image from an input image;
a first classifier, for judging whether the partial image includes a face facing a direction within a first angular range;
at least one other classifier, for judging whether the partial image includes a face facing a direction within at least one other angular range, a portion of which overlaps with the first angular range; and
judging means, for judging that the partial image includes a face facing a direction within a specific angular range, which is the first angular range from which the portion that overlaps with the at least one angular range corresponding to the at least one other classifier has been removed, in the case that partial image is judged to include a face facing a direction within the first angular range and judged not to include a face within the other angular range.

5. A specific direction facing face detecting apparatus as defined in claim 4, wherein:
the at least one other classifier is a second classifier for judging whether an image includes a face facing a direction within a second angular range that overlaps with one end of the first angular range; and the specific angular range is the first angular range, from which the portion that overlaps with the second angular range has been removed.

6. A specific direction facing face detecting apparatus as defined in claim 4, wherein:

the at least one other classifier is a second classifier for judging whether an image includes a face facing a direction within a second angular range that overlaps with one end of the first angular range, and a third classifier for judging whether an image includes a face facing a direction within a third angular range that overlaps with the other end of the first angular range; and the specific angular range is the first angular range, from which the portions that overlap with the second angular range and the third angular range have been removed.

7. A non-transitory computer readable medium having a program that causes a computer to function as a specific facing direction face detecting apparatus, for detecting faces facing specific directions by employing classifiers that judge whether judgment target images include faces facing directions within angular ranges corresponding to predetermined angular ranges, generated by a machine learning technique employing a plurality of sample images that include faces having different shapes and facing directions within the predetermined angular ranges, the program causing the computer to function as:

partial image cutout means, for cutting out a partial image from an input image;

a first classifier, for judging whether the partial image includes a face facing a direction within a first angular range;

at least one other classifier, for judging whether the partial image includes a face facing a direction within at least one other angular range, a portion of which overlaps with the first angular range; and judging means, for judging that the partial image includes a face facing a direction within a specific angular range, which is the first angular range from which the portion that overlaps with the at least one angular range corresponding to the at least one other classifier has been removed, in the case that partial image is judged to include a face facing a direction within the first angular range and judged not to include a face within the other angular range.

8. A non-transitory computer readable medium having a program as defined in claim 7, wherein:

the at least one other classifier is a second classifier for judging whether an image includes a face facing a direction within a second angular range that overlaps with one end of the first angular range; and the specific angular range is the first angular range, from which the portion that overlaps with the second angular range has been removed.

9. A non-transitory computer readable medium having a program as defined in claim 7, wherein:

the at least one other classifier is a second classifier for judging whether an image includes a face facing a direction within a second angular range that overlaps with one end of the first angular range, and a third classifier for judging whether an image includes a face facing a direction within a third angular range that overlaps with the other end of the first angular range; and the specific angular range is the first angular range, from which the portions that overlap with the second angular range and the third angular range have been removed.

* * * * *